Figure 1:
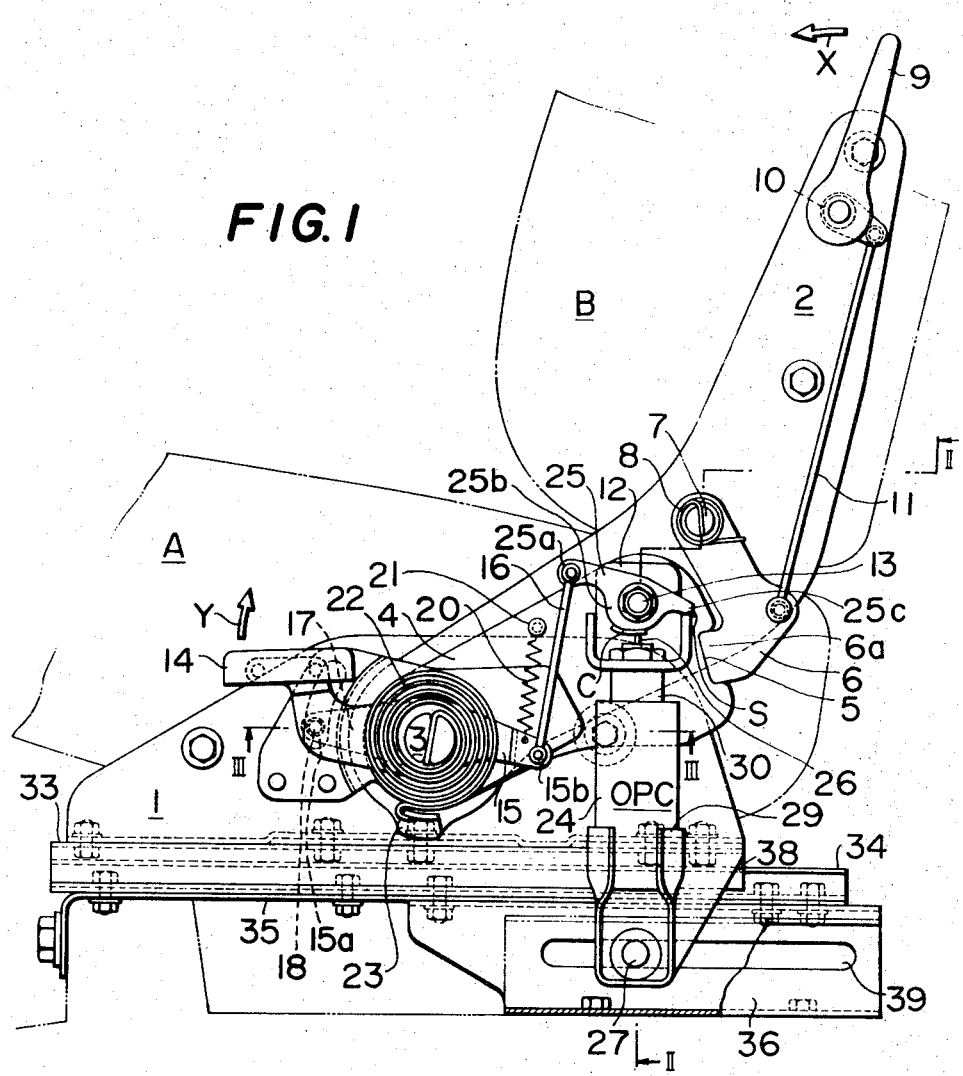

United States Patent [19]

Iida et al.

[11] 3,822,914
[45] July 9, 1974

[54] RECLINING SEAT
[75] Inventors: Teiji Iida; Noboru Yoshimura, both of Tokyo, Japan
[73] Assignee: Toyota Jisosha Kogyo Kabushiki Kaisha, Toyota-shi, Aichi-ken, Japan
[22] Filed: Oct. 3, 1972
[21] Appl. No.: 294,504

[30] Foreign Application Priority Data
Oct. 8, 1971 Japan.............................. 46-79218

[52] U.S. Cl.................. 297/355, 297/216, 297/379
[51] Int. Cl............................................ A47c 1/24
[58] Field of Search .......... 297/355, 379, 361, 378, 297/216

[56] References Cited
UNITED STATES PATENTS
| | | | |
|---|---|---|---|
| 2,673,593 | 3/1954 | Hendrickson | 297/378 |
| 3,309,138 | 3/1967 | Byczkowski et al. | 297/355 |
| 3,398,987 | 8/1968 | Lynn et al. | 297/379 |
| 3,471,140 | 10/1969 | Ballard | 297/355 |

FOREIGN PATENTS OR APPLICATIONS
| | | | |
|---|---|---|---|
| 676,254 | 7/1952 | Great Britain | 297/361 |
| 1,430,838 | 12/1968 | Germany | 297/355 |

*Primary Examiner*—Bobby R. Gay
*Assistant Examiner*—Kenneth J. Dorner
*Attorney, Agent, or Firm*—Stevens, Davis, Miller & Mosher

[57] ABSTRACT

The present invention relates to a reclining seat wherein a latch plate is pivotably mounted on an outer side of seat-back frame, and a releasable means is provided for fixing and unfixing the latch plate with respect to the seat-back frame, and an oil cylinder with a variable effective length is provided between a shaft mounted on said latch plate and a pin formed at the bottom of a seat cushion frame.

The present reclining seat allows the adjustment and set of the angle of inclination of a seat-back continuously over a wide range of angles, and permits the release of said set in a simple way when the seat back is to be inclined either forwardly or backwardly. When the seat back is to be returned back to the previous position from such forwardly or backwardly inclined position, it is only required to return the seat-back as it will automatically lock in the previously set position.

2 Claims, 3 Drawing Figures

}

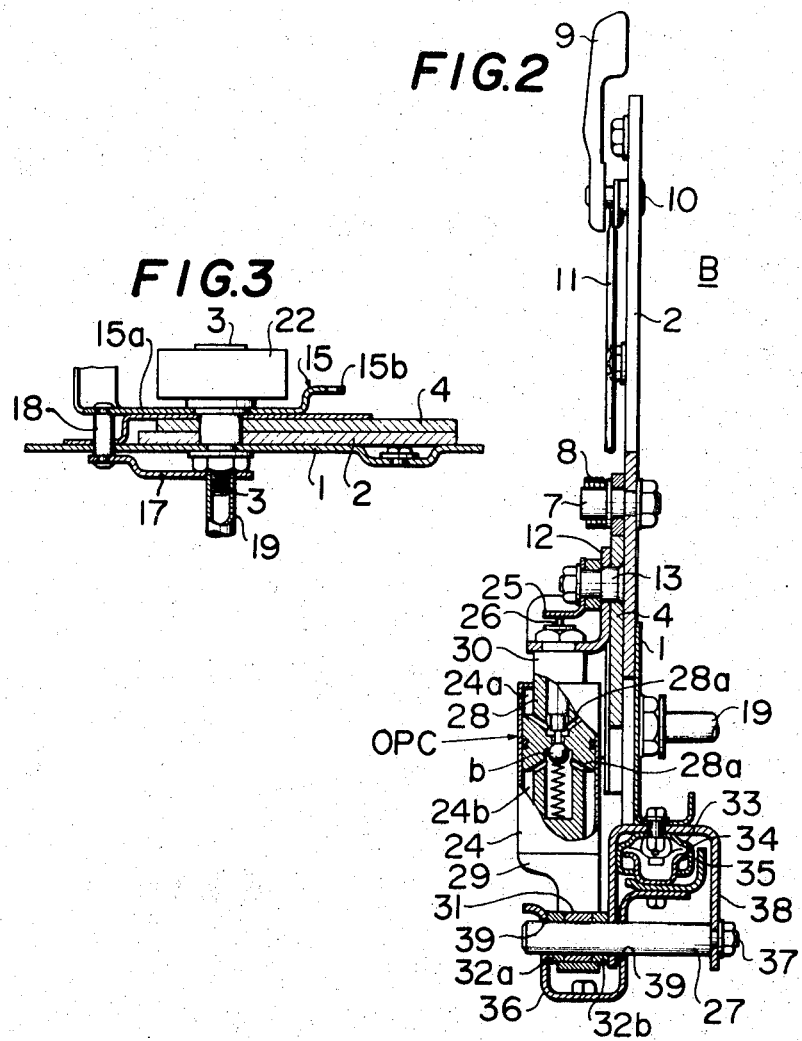

3,822,914

RECLINING SEAT

The present invention relates to a reclining seat, and more particularly to a reclining seat for a vehicle which facilitates adjustment of angle of inclination.

In case of a secondary collision of rear seat passengers against a front seat-back which occurs when vehicles collide against each other from the front or from the back or a vehicle collides against an obstacle, a first big forward impact load applied to the front seat or a second big forward impact load applied to the seat through seat belts which is created when the passengers in the front seat are thrown forwardly, or both loads are applied. In such a case, prior art reclining device for a reclining seat or a coupling mechanism between a seat and a seat track could not withstand such a big forward impact load, resulting in breakage of mating members in the reclining device and departure of an upper rail of the seat track from a lower track, which causes the front seat to incline forwardly. The result is that the passengers in the rear seat are thrown out over the front seat and injured seriously by secondary collision with a front window glass, an instrument panel or the like.

In a reclining seat of a two-door type motor car, a seat-back of the front seat is so constructed that it is folded forwardly when the passengers in the rear seat get on and off. After the passengers get on or off, the seat-back, when the reclining device is operated, is automatically moved to a neutral position. Thus, the passengers in the front seat have to make adjustment of angle of inclination if they want to move the seat-back to a position other than the neutral position.

According to the present invention, a reclining seat is provided which simplifies the adjustment of angle of inclination and improves the safety of passengers.

It is an object of the present invention to provide a reclining seat which 1. allows adjustment of angle of inclination of a seat-back to any angle required for sitting,
2. allows movement of the seat-back between the adjusted angle position and a folded position,
3. has sufficient strength to withstand impact force applied to the seat-back upon collision, and
4. allows automatic reset of the seat-back to its original angle position instead of a neutral position when it is moved back from its folded position.

The present invention is directed to a reclining seat in which a seat-back frame is pivotably mounted to a first shaft mounted to a seat cushion frame to permit change of angle of inclination of the seat-back, characterized in that a latch plate is pivotably mounted on outer side of the seat-back frame, and a releasable means is provided for fixing the latch plate to or disengaging the same from the seat-back frame, and an oil cylinder with variable effective length is mounted between a second shaft formed on the latch plate and a pin formed at the bottom of the seat cushion frame.

The oil cylinder is provided with a valve therein and so constructed that it allows slipping between the cylinder and a piston rod only when the valve is opened. Thus a locked chain is formed which comprises a first link corresponding to the length on the seat cushion frame betwen the pin at lower end of the oil cylinder and the first shaft, a second link corresponding to the length on the latch plate between the first shaft and the second shaft, and a third link corresponding to the effective length of the oil cylinder. When the valve of the oil cylinder is closed making the piston rod integral with the cylinder, there is no relative movement between the links in the locked chain and the seat-back is set at an angle.

When the valve of the oil cylinder is opened to allow sliding movement of the piston rod, a relative movement between the first and second links occurs to alter the angle of inclination of the seat-back. In the seat-back in accordance with the present invention, when the release means is operated the integrity with the seat-back frame is released so that the seat-back may be inclined forwardly or backwardly to a great extent or even it may be fallen along the horizontal. In such a case, the seat-back is so designed that it may be automatically reset to the original angle position instead of the neutral position. Furthermore, if the seat-back tends to be inclined forwardly to a great extent when the impact force due to the vehicle collision is applied thereto, the variable support means described above serves as an oil pressure damper to absorb the impact force and insure the safety of the passenger.

The present invention will now be described in more detail with reference to the accompanying drawings in which;

FIG. 1 is a front view of a major part of a reclining seat in accordance with the present invention, FIG. 2 is a sectional view taken on the line II—II in FIG. 1, FIG. 3 is a sectional view taken on the line III—III in FIG. 1.

Referring to the drawings which show a preferred form of the present invention, main shafts 3 project from seat cushion frames 1 positioned on either side of a seat cushion (A). Pivotably mounted on each of the main shaft 3 is a seat-back frame 2 located on either side of a seat-back (B). On the outer side of the seat-back frame 2 a latch plate 4 having cutout portion 5 at its rear end is pivotably mounted at its front end. A shaft 7 is formed on the seat-back frame 2, on which shaft a mating plate 6 having a mating projection 6a formed for engaging the cutout portion 5 of the latch plate 4 is pivotably mounted. A spiral spring 8 having its inner end located on the shaft 7 and its outer end on the mating plate 6 is provided. Through a resilient force of the spring the mating plate 6 is normally biased in clockwise direction, that is, it is so biased that the mating projection 6a of the mating plate 6 always engages with the cutout portion 5 of the latch plate 4. At the upper end of the seat-back frame 2 a shaft 10 is formed on which an adjustable handle 9 coupled by a link comprising the mating plate 6 and a rod 11 is rotatably mounted for releasing the engagement between the mating plate 6 and the latch plate 4. On a side of the seat cushion frame 1, a handle lever 15 is rotatably journaled to the main shaft 3 external to the latch plate 4, and a pin 18 is mounted at a front end 15a of the handle lever 15 for integrally moving an actuating lever 17 for actuating a reclining device, not shown, on the opposite side of the seat cushion (A). Journaled to a rear end 15b of the handle lever 15 is a rod 16 for allowing oil to flow to passages of an oil piston cylinder assembly to be described later. 14 designates an actuating handle mounted to the handle lever 15.

In FIG. 3, 19 designates a pipe pivotably supported at inner end of the main shaft 3 and jointly operates with the actuating lever 17 to transfer the movement of the handle lever 15 to the reclining device on the other side. The other end of the pipe 19 (not shown) is coupled to an actuating lever of the reclining device on the opposite side through the bottom of the seat cushion (A).

The spring 20 is provided in order to bias the handle lever 15 so that it is normally pivoted in a counterclockwise direction. One end of the spring is mounted to a pin 21 formed on the latch plate 4 while the other end thereof is mounted to the handle lever 15.

The spiral spring 22 is provided to normally bias the seat-back (B) forwardly, and its inner end is mounted to the center of the main shaft 3 while its outer end is mounted to a hook plate 23 formed at lower end of the seat-back frame.

An oil piston-cylinder assembly (OPC), to be described in more detail, is positioned between a stay 12 rotatably mounted on a shaft 13 projecting from the latch plate 4 and a U-shaped plate 29 rotatably mounted on a key pin 27 mounted on the seat track bracket 36.

The oil piston-cylinder assembly (OPC) comprises, as shown in FIG. 2, an oil cylinder 24 and a piston 28 which is arranged in the oil cylinder 24 to define an upper chamber 24a and a lower chamber 24b. The piston 28 is provided with an oil passage 28a for communicating the two chambers 24a, 24b with each other, and a ball valve (b) for blocking the communication therebetween. The ball valve (b) is normally biased to block the oil passage 28a.

The upper end of the piston rod 30 formed at the top of the piston 28 is fixed to the stay 12, and a release rod 26 is slidably mounted for urging the ball valve (b) down to a communicating position. The upper end of the release rod 26 extends above the stay 12.

A release lever 25 formed with three arms for controlling the ball valve (b) in the oil cylinder 24 is pivotably mounted to the shaft 13, the first arm 25a being coupled to the other end of the rod 16 journalled to the rear end 15b of the handle lever 15 to be moved in response to the operation of the handle lever 15. The second arm 25b of the release lever 25 is formed with a cam (c) adapted to engage with upper end of the release rod 26, while the third arm 25c is constructed to engage with a stopper (S) during its non-operating state, which is a wall shoulder of the stay 12.

Attached to a lower end of the oil cylinder 24 an upper portion of the U-shaped plate 29 by means of welding around its periphery. The lower portion of the U-shaped plate 29 is arranged to enclose a cylindrical member 31 rotatably set to a key pin 27 set to the seat track bracket 36 fixed to a body of the vehicle. 32a and 32b designate spacers for preventing rightward and leftward swing of the oil cylinder 24.

The lower end of the seat cushion frame 1 is formed into L-shaped cross-section and integrally secured to an upper rail 33 of the seat track through a seat track holding plate 38 of inverted U-shaped cross-section, by means of bolts and nuts.

On the other hand, a lower rail 34 of the seat track is integrally fixed to the seat track bracket 36 through the lock plate 35 by means of bolts and nuts.

The set pin 27 extends through both sides of the lower end of the seat track holding plate 38 and the seat track bracket 36, and one end thereof is held locked by a nut 37 while the other end thereof is engaged with an elongated bore 39 formed on the seat track bracket 36 so that it permits back and forth movement of the seat, that is, the set pin 27 may move back and forth with the upper rail 33.

The operation of the device thus constructed in accordance with the present invention will now be described.

During normal operation, when the seat-back (B) is to be adjusted to a desired angle of inclination, the actuating handle 14 is raised in the direction of an arrow (Y) so that the handle lever 15 is rotated clockwise and the rod 16 is pulled downwardly causing the release lever 25 connected to the other end of the rod 16 to pivot counterclockwise around the shaft 13. This pivotal movement of the release lever 25 causes the cam plate (c) of the second arm 25b to push down the release rod 26 and thus the ball valve (b) is opened. As a result, through the oil passage 28a in the piston 28, the upper chamber 24a and the lower chamber 24b of the oil cylinder 24 communicate with each other and the piston 28 is allowed to reciprocate up and down within the oil cylinder 24. At this time, the latch plate 4 and the seat-back frame 2 are pivoted together because the mating projection 6a of the mating plate 6 engages into the cutout 5 of the plate 4. Consequently, the seat-back (B) may be adjusted to any of continuous angle position, and by releasing the actuating handle 14 the components are reset to their original position. Since the ball valve (b) blocks the oil passage 28a in the piston 28 under these conditions, the seat-back frame 2 is fixed to the preadjusted angle of inclination.

In the two-door type car, when the rear seat passengers get on or off, or when it is desired to drop the seat-back (B) toward the rear seat as much as possible, the adjustable handle 9 arranged at the upper end of the seat-back frame 2 is pivoted counterclockwise, that is, to the direction indicated by an arrow (X), so that the rod 11 is pulled up and the mating plate 6 is pivoted counterclockwise and the engagement of the cutout 5 of the latch plate 4 with the mating projection 6a of the mating plate 6 is disengaged. The result is that by dropping the seat-back (B) forwardly or backwardly, only the seat-back frame 2 is pivoted around the main shaft 3 facilitating drop adjustment of the seat-back (B). Subsequently, as the seat-back (B) is moved back to its normal position, the mating projection 6a of the mating plate 6 fits into the cutout 5 of the latch plate 4 which has been ready for receiving the projection 6a at the originally set position. In this manner, the seat-back is reset to its original position unlike the prior art device in which the seat-back (B) is reset to the neutral position.

When the rear seat passengers collide against the front seat-back (B) upon collision of the car and the impact force is applied to the seat-back frame 2, the impact force is primarily absorbed and buffered by the oil piston-cylinder assembly (OPC) through the mating plate 6 and the latch plate 4 and also received by the elements of the seat track coupled to the body, so that a considerably high impact resistance is exhibited compared with a prior art device in which the reclining device itself receives the high impact force.

Although in the illustrated embodiment the oil cylinder 24 is directly compled to the seat track bracket 36 through the set pin 27, the cylinder 24 may be directly coupled to the seat cushion frame 1.

According to the present invention thus constructed, the angle of inclination of the seat-back during sitting can be adjusted and set to any of continuous angle position over a wide range of angles. When it is required to drop the seat-back forwardly to allow the passenger to get in or out or to drop the seat-back backwardly for resting, the set may be easily released. Furthermore, when the seat-back is again moved back from the extended position, the seat-back can be automatically reset to its preadjusted angle position by merely raising the seat-back.

Since the positioning of the seat-back is effected through the use of the oil piston-cylinder assembly and to the members on the seat cushion frame rigidly attached to the body, the impact resistance of the seat-back is remarkably increased with the cooperation of the ability of the oil piston-cylinder itself for absorbing and thus buffering the impact energy, and the safety of the passengers is insured.

By the use of the oil piston-cylinder assembly, the elements can be so shaped and dimensioned that they provide a high strength and small size without reducing the dwelling space in a car room. Furthermore, even when the oil passage switching valve system is releasing the falling-down of the seat-back is prevented provided that the cylinder and the piston are not broken. This further improves the safety and the reliability of the device.

What we claim is:

1. A reclining seat comprising
   a seat-cushion frame having a main shaft projection therefrom,
   a seat-back frame pivotably mounted on said main shaft,
   a latch plate having a cutout portion formed at one end and pivotably mounted on said main shaft,
   a seat-back shaft projecting from said seat-back frame,
   a mating plate pivotably mounted on said seat-back shaft and having a mating projection adapted to engage with said cutout portion of said latch plate,
   means to bias said mating plate in engagement with said cutout,
   an adjustable handle for releasing said engagement,
   an oil piston-cylinder assembly having its upper end pivotably mounted to said latch plate and having its lower end attached to a side of the seat cushion frame rigidly coupled to a vehicle body,
   said oil piston-cylinder assembly having a passage through which oil may flow to allow the piston to move,
   control means for said oil piston-cylinder assembly to control the flow of oil through said passage, and
   an actuating handle in engagement with said control means of said oil piston-cylinder whereby said seat-back frame can be positioned and maintained at any angle of inclination.

2. A reclining seat according to claim 1, wherein said side of the seat cushion frame rigidly coupled to a vehicle body comprises
   a seat tract bracket having two parallel sides and secured to the floor of the vehicle with an elongated bore in each side extending in a direction parallel to said track,
   a seat track holding plate secured to said seat cushion frame and having two sides extending downwardly, and
   a set pin retained at one end by a nut and extending through said two sides of said seat track holding plate, through said elongated bores and in engagement with said lower end of said oil piston-cylinder assembly whereby the seat is permitted to move forward and backward.

* * * * *

UNITED STATES PATENT OFFICE
CERTIFICATE OF CORRECTION

PATENT NO. : 3,822,914
DATED : July 9, 1974
INVENTOR(S) : Teiji Iida and Noboru Yoshimura It is certified that error appears in the above-identified patent and that said Letters Patent are hereby corrected as shown below:

The correct address for both inventors should read

--Toyota-Shi, Aichi-ken, Japan--.

The correct name of the Assignee should read

--TOYOTA JIDOSHA KOGYO KABUSHIKI KAISHA--.

Signed and Sealed this thirtieth Day of September 1975

[SEAL]

Attest:

RUTH C. MASON
Attesting Officer

C. MARSHALL DANN
Commissioner of Patents and Trademarks